United States Patent
Nagarajan et al.

[19]

[11] Patent Number: 5,884,174

[45] Date of Patent: Mar. 16, 1999

[54] CALL ADMISSION CONTROL FOR WIRELESS NETWORKS

[75] Inventors: Ramesh Nagarajan, Aberdeen, N.J.; Ramachandran Ramjee; Donald Fred Towsley, both of Amherst, Mass.

[73] Assignee: Lucent Technologies Inc., Murray Hill, N.J.

[21] Appl. No.: 660,635

[22] Filed: Jun. 7, 1996

[51] Int. Cl.[6] .................................................. H07Q 7/01
[52] U.S. Cl. ......................... 455/436; 455/436; 455/438; 455/443; 455/450; 455/453
[58] Field of Search ..................... 455/436, 438, 455/443, 450, 453, 439, 452, 455, 512, 513

[56] References Cited

U.S. PATENT DOCUMENTS

| | | | |
|---|---|---|---|
| 4,670,899 | 6/1987 | Brody et al. | 455/453 |
| 4,718,081 | 1/1988 | Brenig | 455/436 |
| 5,081,671 | 1/1992 | Raith et al. | 455/450 |
| 5,301,356 | 4/1994 | Bodin et al. | 455/436 |
| 5,574,977 | 11/1996 | Joseph et al. | 455/450 |

*Primary Examiner*—Wellington Chin
*Assistant Examiner*—Thuan Nguyen
*Attorney, Agent, or Firm*—Steven R. Bartholomew

[57] ABSTRACT

Improved wireless telephone call admission methods for admitting new and/or handoff calls into a wireless telephone network having a plurality of communications channels. One such method, fractional guard channel call admission, effectively reserves a non-integral number of guard channels for handoff calls by rejecting new calls in accordance with a probability value that is dependent upon the current channel occupancy. Fractional guard channel call admission results in a significant reduction of new call blocking when a fixed constraint is placed on the handoff call blocking probability. Fractional guard channel call admission also provides improvements over the integral guard channel policy by minimizing the number of required channels when fixed constraints are placed on both the new call blocking probability and the handoff call blocking probability. In addition, methods are disclosed for computing optimized parameter settings for the fractional guard channel policy in the context of specified design objectives.

16 Claims, 7 Drawing Sheets

| ITEM | TOTAL ARRIVAL RATE (NEW AND HANDOFF CALLS) | HANDOFF CALL ARRIVAL RATE | C | INTEGRAL POLICY ($B_n$) | FRACTIONAL POLICY ($B_n$) | PERCENTAGE GAIN FOR FRACTIONAL |
|---|---|---|---|---|---|---|
| CASE I | 6 | 1 | 12 | 0.024859 | 0.0013313 | 46.45 |
| CASE II | 7 | 2 | 13 | 0.031118 | 0.021538 | 30.78 |
| CASE III | 12 | 1 | 19 | 0.029255 | 0.022536 | 22.97 |
| CASE IV | 14 | 2 | 22 | 0.023117 | 0.015211 | 34.20 |
| CASE V | 14 | 2 | 23 | 0.0074454 | 0.007454 | 0.0 |

FIG. 6

| ITEM | TOTAL ARRIVAL RATE OF NEW AND HANDOFF CALLS | HANDOFF CALL ARRIVAL RATE | INTERGRAL GUARD CHANNELS (C,T) | FRACTIONAL GUARD CHANNELS (C,T+$\beta$) |
|---|---|---|---|---|
| CASE I | 6 | 1 | (13, 12) | (12, 11.625) |
| CASE II | 7 | 2 | (14, 13) | (14, 14.0) |
| CASE III | 12 | 1 | (20, 19) | (20, 20.0) |
| CASE IV | 14 | 2 | (23, 22) | (22, 21.313) |

CALL ADMISSION CONTROL FOR WIRELESS NETWORKS

BACKGROUND OF THE INVENTION

1. Field of the Invention

The invention relates generally to wireless telephony, and more specifically to techniques for controlling access to wireless telephone networks.

2. Description of Related Art

At present, there is an ever-increasing demand for personal communications services which will provide reliable voice and data communications, anytime and anywhere, via small, lightweight, portable terminals. The capacity of the existing U.S. cellular telephone network, which uses frequencies in the 824–849 Mhz and 869–894 Mhz bands, may be insufficient to meet this demand. Accordingly, the Federal Communications Commission (FCC) has allocated a portion of the electromagnetic frequency spectrum to PCS (personal communications services). It is possible to utilize existing cellular telephone communications protocols to implement PCS. For example, the service area of a PCS network may be partitioned into a plurality of cells, macrocells, microcells, and/or picocells. A base station, including a processor and a plurality of RF transceivers, manages channel allocation within each cell.

Two important quality-of-service (QOS) criteria for existing cellular networks are the fraction of new calls, and the fraction of handed-off calls, that are blocked due to unavailability of channels. These QOS criteria are also applicable to other types of wireless communications systems, including PCS. A handed-off call refers to a call in progress that is transferred from a first cell site to a second cell site. A channel is any communications channel adapted for carrying information. The definition of a channel depends upon the specific characteristics of a given cellular network. For example, in the case of a conventional frequency-division, multiple-access (FDMA) system, channels consist of an assigned bandwidth in the frequency domain. If one commonly-utilized type of time-division multiple access (TDMA) is employed, channels consist of a given predefined time slot within a conventional FDMA channel. In code-division, multiple-access (CDMA) systems, each channel is uniquely defined by a predetermined digital code that modulates user information using spread-spectrum modulation techniques. Channels could also be defined in terms of available computing resources at each of the base station processors. However, note that the two quality-of-service criteria set forth above are meaningful, irrespective of the particular type of communications channel employed in a wireless network.

Quality-of-service criteria are used to measure the effectiveness of wireless telephone call admission control policies. These criteria can be employed to formulate three illustrative design objectives: (1) minimizing a linear function of the new call blocking probability and the handoff call blocking probability, (2) minimizing the new call blocking probability while placing a fixed constraint on the handoff call blocking probability, and (3) minimizing the number of channels while placing fixed constraints on both blocking probabilities (i.e., the blocking of new, as well as handoff, calls). Existing call admission control techniques address the first of the three basic design objectives described above; namely, minimizing a linear function of the new call blocking and handoff call blocking probabilities so long as it is not also desired to simultaneously optimize other design objectives. For example, one such call admission control technique, generally known to those skilled in the art as the guard channel policy, referred to herein as the integral guard channel policity, explicitly reserves a given set of channels for handoff calls. However, existing techniques do not adequately address the two remaining design objectives, which are minimizing the new call blocking probability with a fixed constraint on handoff call blocking, and minimizing the number of channels with fixed constraints on all call blocking probabilities.

Figure 1:
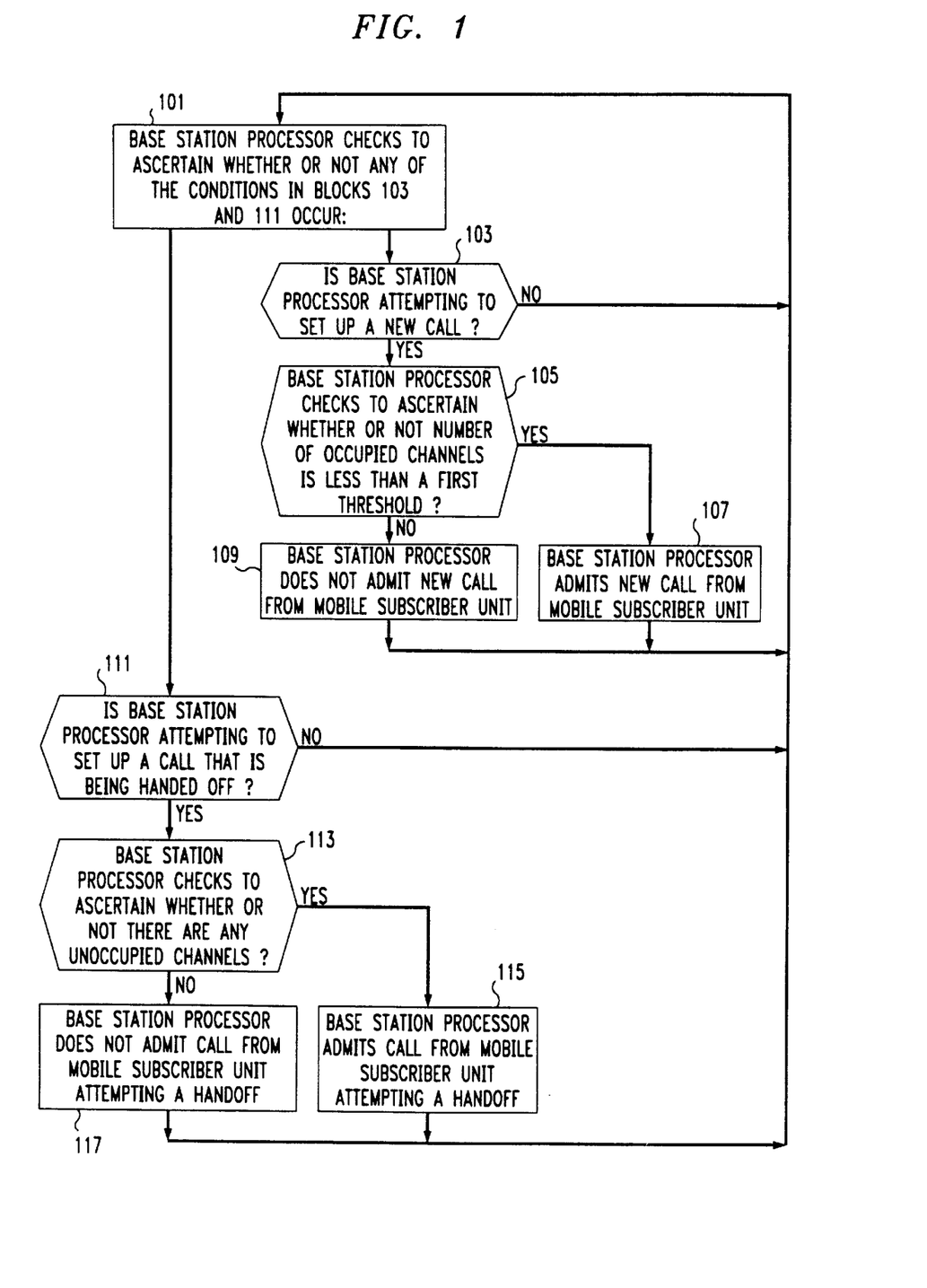
FIG. 1 is a software flowchart setting forth a prior art method of controlling call admission in a cellular telephone network.

Refer to FIG. 1, which sets forth an illustrative prior-art method termed the integral guard channel policy. The method commences at block 101, where the base station processor of a wireless telephone network checks to ascertain whether or not any of the conditions in the immediately following blocks, namely, blocks 103 and 111, occur. At block 103, a test is performed to ascertain whether or not the base station processor is attempting to set up a new call in response to a request that the processor receives from a telephonic device. The negative branch from block 103 leads back to block 101, and the affirmative branch from block 103 leads to block 105. At block 105, the base station processor checks to ascertain whether or not the number of occupied channels is less than a first threshold. If the number of occupied channels is less than a first threshold, the base station processor admits the new call from (or to) the mobile subscriber unit (block 107), and the program loops back to block 101. However, if the number of occupied channels is not less than the first threshold, the base station processor does not admit the new call from (or to) the mobile subscriber unit (block 109), and the program loops back to block 101.

At block 111, the processor checks to see whether or not the base station processor is attempting to set up a call that is being handed off. If not, the program loops back to block 101. If so, the program continues to block 113, where the base station processor checks to ascertain whether or not there are any unoccupied channels. If there are any unoccupied channels, the base station processor admits the handoff call from the mobile subscriber unit attempting a handoff (block 115), and the program loops back to block 101. However, if there are not any unoccupied channels, the base station processor does not admit the handoff call from the mobile subscriber unit attempting a handoff (block 117), and the program loops back to block 101.

SUMMARY OF THE INVENTION

Improved wireless telephone call admission methods are disclosed for admitting new and/or handoff calls into a wireless telephone network having a plurality of communications channels. One such method, fractional guard channel call admission, effectively reserves a non-integral number of guard channels for handoff calls by rejecting new calls in accordance with a probability value that is dependent upon the current channel occupancy. Fractional guard channel call admission results in a significant reduction of new call blocking when a fixed constraint is placed on the handoff call blocking probability. Fractional guard channel call admission also provides improvements over the integral guard channel policy by minimizing the number of required channels when fixed constraints are placed on both the new call blocking probability and the handoff call blocking probability. In addition, methods are disclosed for computing optimized parameter settings for the fractional guard channel policy in the context of specified design objectives.

DETAILED DESCRIPTION OF THE PREFERRED EMBODIMENTS

In a wireless telephone network, one or more base stations communicate with one or more mobile subscriber units. In general, each base station includes a plurality of RF transceivers and a base station processor. The base station processor is responsible for assigning channels to a mobile subscriber unit, enabling the mobile subscriber unit to communicate with other mobile subscriber units, and/or to communicate with landline telephone users connected to the public switched telephone network (PSTN). Note that the base station itself is typically assigned a set of channels, and this assignment could be either static or dynamic. For illustrative purposes, the examples disclosed herein assume a static assignment of channels, but it is to be understood that these examples are also applicable to a dynamic assignment scenario.

Many wireless telephone networks are organized into cells, wherein a respective base station (or a respective group of base stations) provides wireless coverage substantially throughout a corresponding cell. As a mobile subscriber unit engaged in an active telephone call moves from a first cell into a second cell, the second cell needs to allocate a channel for this telephone call.

The transferring of an ongoing wireless telephone call from a first cell to a second cell, often termed a handover or a handoff, should ideally be imperceptible from the standpoint of the user of the mobile subscriber unit. Unfortunately, if the second cell, i.e., the destination cell, has no available channels, the wireless telephone call is terminated. Such disconnection of an ongoing call is highly undesirable. One of the goals of a wireless network designer is to keep the probability of such disconnections, termed handoff blocking probability, low. On the other hand, specifically reserving channels for the purpose of handling handoff calls could increase the percentage of new calls that are blocked. As a result, there is a trade-off between the two quality-of-service (QOS) criteria, the handoff blocking probability and the new call blocking probability.

According to various methods disclosed herein, enhanced call admission control policies are described which improve the aforementioned quality of service criteria. These methods are applicable, for example, in the context of the three illustrative design objectives described above in the Description of Related Art. Recall that the first design objective is to minimize a linear function of the new call blocking probability and the handoff call blocking probability, the second design objective is to minimize the new call blocking probability while placing a fixed constraint on the handoff call blocking probability, and the third design objective is, for a given number of channels, to minimize the new call blocking probability, subject to a fixed constraint on the handoff blocking probability.

In many, but not all, wireless networks, the simultaneous attainment and/or optimization of all three of these objectives may not be possible or necessary, necessitating a focus on one, or perhaps two, of the design objectives. The selection of which design objective (or which set of design objectives) to optimize is based upon the requirements of a specific system application. For example, the first design objective, minimizing a linear function of the new call blocking probability and the handoff call blocking probability, appeals to the network provider in terms of maximizing the revenue obtained. However, minimizing the new call blocking probability while placing a fixed constraint on the handoff call blocking probability guarantees a particular level of service to already-admitted wireless telephone users, while trying to maximize the revenues obtained. Minimizing the number of required channels while placing fixed constraints on both the new call blocking probability and the handoff call blocking probability is more of a network engineering concern that involves apriori resource allocation based upon, for example, traffic projections.

As stated above, the well-known integral guard channel policy was designed to optimize the minimization of a linear function of the new call blocking probability and the handoff call blocking probability. The notion of these permanently-allocated guard channels was introduced in the mid-1980s as a call admission mechanism to give priority to handoff calls over new calls. By way of contrast, the fractional guard channel method disclosed herein effectively reserves a non-integral number of guard channels for handoff calls by rejecting new calls with some probability that depends on the current channel occupancy. An illustrative embodiment of this fractional guard channel method is designed to optimize the minimization of new call blocking probability when a fixed constraint is placed on the handoff call blocking probability. This illustrative embodiment is also designed to minimize the number of channels when placing fixed constraints on both the new call blocking probability and the handoff call blocking probability.

In an operational wireless network, in order to ensure that the QOS requirements are being met on an ongoing basis, it may be necessary to dynamically vary the parameters of an admission control policy as, for example, the traffic load varies. Pursuant to the integral guard channel policy, it may be necessary to dynamically change the number of guard channels with the traffic load. The fractional guard channel method offers a greater number of parameters to work with and, hence, offers greater flexibility in tuning the system performance in a dynamically-changing environment. Furthermore, for a given load and for a specified set of QOS metrics, the methods disclosed herein may be employed for fast real-time computation of optimal parameter settings of the fractional guard channel policy.

Consider a cellular network with C channels in a given cell. The integral guard channel method reserves a subset S of these channels (where S<C) for handoff calls. Whenever the channel occupancy exceeds a first threshold ($T1=\{C-S\}$), the integral guard channel method rejects all new calls. Pursuant to the fractional guard channel method, new calls are accepted with a certain probability determined with reference to the current channel occupancy. However, note that both of the aforementioned methods accept handoff calls as long as channels are available.

Figure 2:
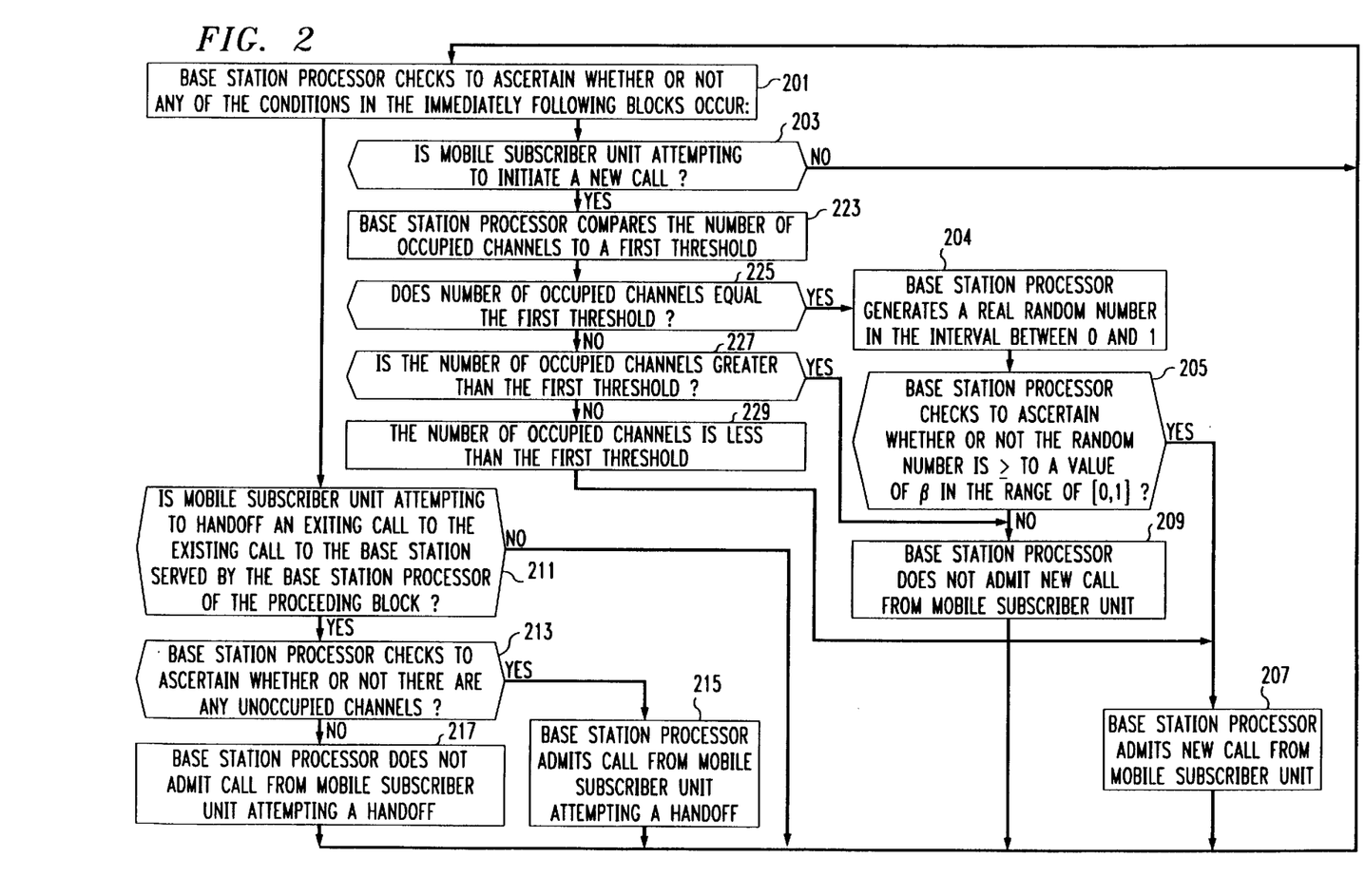
FIG. 2 is a software flowchart setting forth a method of controlling call admission in a wireless telephone network according to a first embodiment disclosed herein.

FIG. 2 is a software flowchart setting forth a first method of wireless telephone network access control, termed the fractional guard channel method. This method may be employed with appropriate parameter values to address any of the aformentioned design objectives, such as, for example, to minimize a linear function of new and handoff call blocking probabilities. The procedure commences at block 201 where the base station processor checks to ascertain whether or not any of the conditions set forth in the immediately following blocks, namely, blocks 203 and 211, occur. At block 203, the processor checks to see whether or not the mobile subscriber unit is attempting to initiate a new call. The negative branch from block 203 leads back to block 201, and the affirmative branch from block 203 leads to block 223.

At block 223, the base station processor compares the number of occupied channels to a first threshold. If the number of occupied channels is equal to the first threshold as determined at block 225, the program advances to block 204. If the number of occupied channels is greater than the first threshold as determined at block 227, the program advances to block 209, where the new call is admitted, and the program loops back to block 201. If the number of occupied channels is less than the first threshold as determined at block 229, the program advances to block 207, where the new call is not admitted, and the program loops back to block 201.

The affirmative branch from block 225 leads to block 204, where the base station processor generates a real random number in the interval between 0 and 1. Next, at block 205, the base station processor checks to ascertain whether or not the real random number is less than or equal to a value, $\beta$, in the range of [0,1]. If the random number is less than or equal to $\beta$, the base station processor admits the new call from the mobile subscriber unit (block 207), and the program loops back to block 201. However, if the random number is not less than or equal to $\beta$, the base station processor does not admit the new call from the mobile subscriber unit (block 209), and the program loops back to block 201.

At block 211, the processor checks to see whether or not the mobile subscriber unit is attempting to hand off an existing call to the base station served by the base station processor of block 201. If not, the program loops back to block 201. If so, the program continues to block 213, where the base station processor checks to ascertain whether or not there are any unoccupied channels. If there are any unoccupied channels, the base station processor admits the handoff call from the mobile subscriber unit (block 215), and the program loops back to block 201. However, if there are not any unoccupied channels, the base station processor does not admit the handoff call from the mobile subscriber unit (block 217), and the program loops back to block 201.

The procedure of FIG. 2 is employed in conjunction with a wireless telephone network where, for example, new calls and handoff calls are expected to occur in accordance with a Poisson distribution. The channel holding time for new calls and handoff calls is expected to be exponentially distributed, and the interval between two calls from a mobile subscriber unit is expected to be much greater than the mean call holding time. The aforementioned set of assumptions, employed to develop and/or to evaluate various prior-art wireless network models, are reasonable so long as the number of mobile subscriber units in a cell is much greater than the number of channels. These assumptions may be employed to demonstrate the optimum nature of the disclosed method in the context of specified design objectives.

Note that FIG. 2 describes a specific embodiment of the methods disclosed herein, where $\beta$ takes on a value of either 0 or 1. However, in a more general embodiment of the invention, each value of channel occupancy may be associated with a specific value of $\beta$, where $\beta$ is a real number in the range of [0,1] inclusive.

Figure 3A:
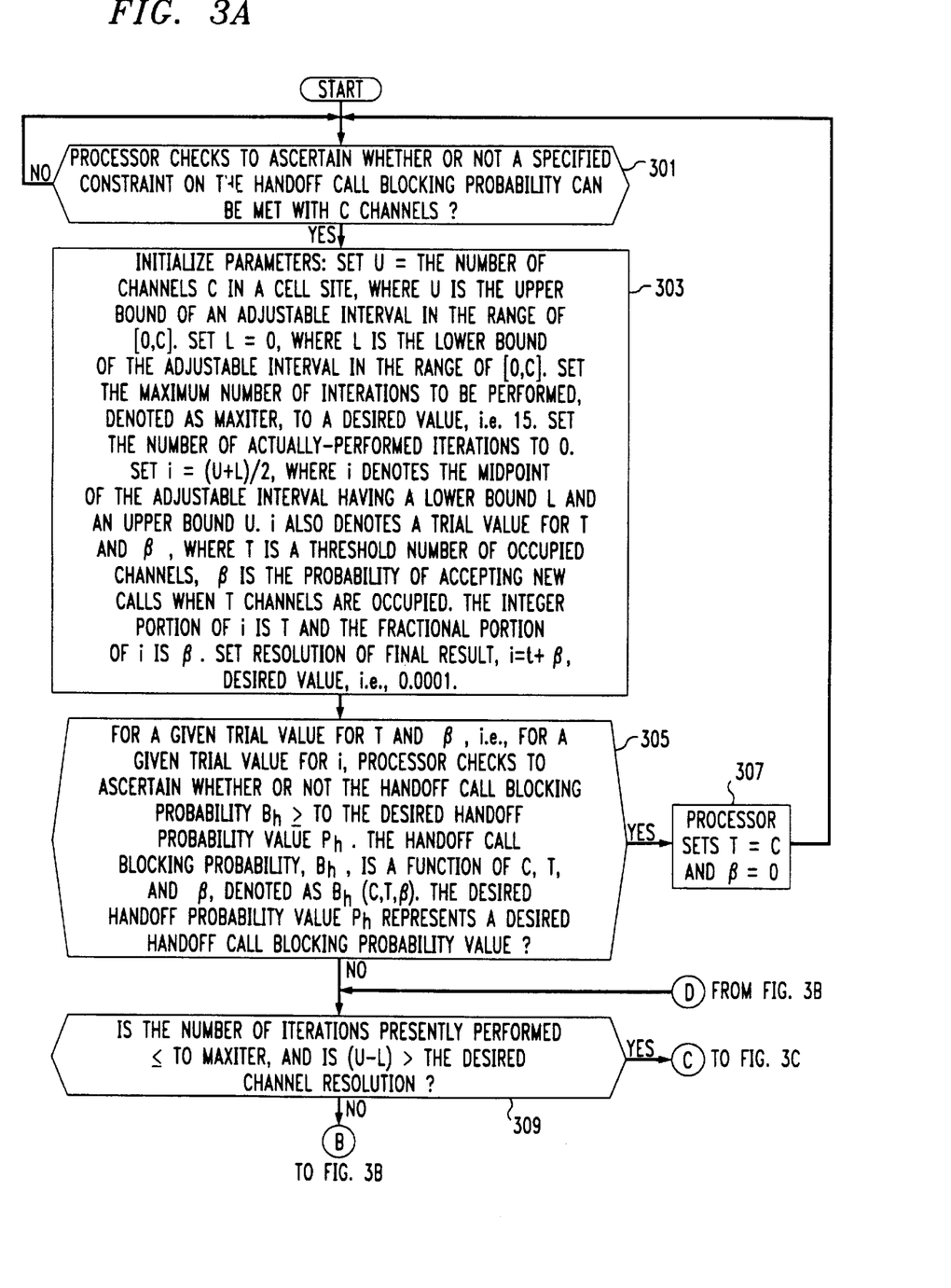
FIGS. 3A–3C together comprise a software flowchart setting forth a method of controlling call admission by computing optimized parameter settings for the fractional guard channel policy in the context of a first set of specified design objectives.
Figure 3B:
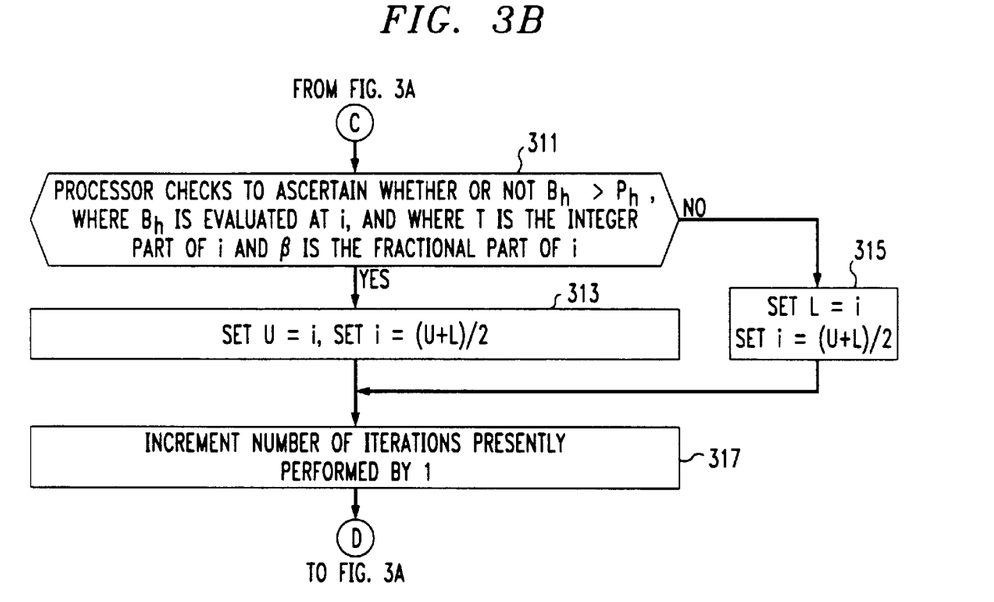
Figure 3C:
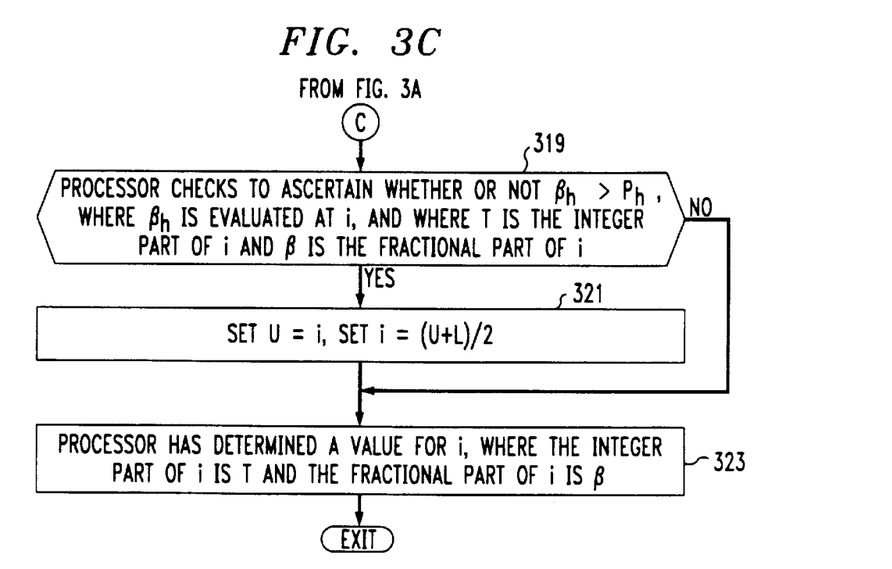

FIGS. 3A–3C together comprise a software flowchart setting forth a method of controlling call admission by computing optimized parameter settings for the fractional guard channel policy in the context of a first set of specified design objectives. This method minimizes the probability of blocking new calls in situations where a fixed constraint is placed on the probability of blocking handoff calls. The method commences at block 301 where a processor checks to ascertain whether or not a specified constraint on the handoff call blocking probability can be met with C channels. In the present context, this processor could, but need not, be a base station processor conducting computations in real time. Alternatively, the processor could be an offline computer conducting computations for the purpose of improving and/or constructing a wireless telephone network.

Next, at block 303, the processor initializes some parameters. A parameter, U, is set equal to the number of channels C in a wireless telephone network cell site, where U represents the upper bound of an adjustable interval contained entirely within the range of a fixed interval of [0, C]. The adjustable interval is 'adjustable' in that, during execution of the method of FIGS. 3A–3C, the value of the upper bound can be changed during successive iterations. Another parameter, L, is set equal to zero (0), where L represents the lower bound of an adjustable interval contained entirely within a fixed interval in the range of [0, C]. Note that, during execution of the method of FIGS. 3A–3C, the value of the lower bound can be changed during successive iterations. The maximum number of iterations to be performed, denoted as maxiter, is set to a desired value such as, for purposes of illustration, 15. The number of iterations actually performed is set to zero (0).

Also at block 303, a parameter, i, is set equal to (U+L)/2, where i denotes the midpoint of the adjustable interval with lower bound L and upper bound U. However, i also denotes a trial value, i.e., a current estimate, for T and $\beta$, where T is a threshold number of occupied channels, and $\beta$ is the probability of accepting new calls when T channels are occupied. The integer portion of i is T, and the fractional portion of i is $\beta$. For example, if i is equal to 5.11, then T is equal to 5, and $\beta$ is equal to 0.11. Finally, the resolution of the final estimate i for T and $\beta$ is set to a desired value as, for example, 0.0001.

Program control progresses to block 305 where, for a given trial value of T and $\beta$, i.e., for a given trial value of i, the processor checks to ascertain whether or not the handoff call blocking probability, $B_h$, is less than or equal to the desired handoff call blocking probability value, $P_h$. The handoff call blocking probability, $B_h$, is a function of C, T, and $\beta$, denoted as $B_h(C, T, 13)$. The affirmative branch from block 305 leads to block 307 where the processor sets T=C and $\beta$=0, and the program then loops back to block 301.

The negative branch from block 305 leads to block 309 where the processor determines whether or not the number of iterations actually performed is less than or equal to the maximum number of iterations to be performed (maxiter), AND whether or not (U−L) is greater than the desired channel resolution. If both of these conditions are true, the program progresses to block 311 and, if none or only one of these conditions is true, the program progresses to block 319.

At block 319, the processor checks to ascertain whether or not $B_h$ is greater than $P_h$, where $B_h$ is evaluated at i, and where T is the integer part of i and β is the fractional part of i. If $B_h$ is greater than $P_h$, the program advances to block 313, where U is set equal to i, and i is set equal to (U+L)/2. The number of iterations actually performed is then incremented by 1 at block 317, and the program then loops back to block 309. If, however, $B_h$ is not greater than $P_h$, as determined at block 311, the program advances to block 315 where L is set equal to i, and i is set equal to (U+L)/2. The number of iterations actually performed is incremented by 1 at block 317, and the program loops back to block 309.

The negative branch from block 309 leads to block 319 where the processor checks to ascertain whether or not $B_h$ is greater than $P_h$, where $B_h$ is evaluated at i, and where T is the integer part of i, and β is the fractional part of i. If so, the program advances to block 321 where U is set to i, and i is set to (U+L)/2, and the program then progresses to block 323. The negative branch from block 319 leads directly to block 323. At block 323, the processor has determined that the current trial value for i is the final estimate for i, where the integer part of i is T and the fractional part of i is β. The program then exits.

Figure 4A:
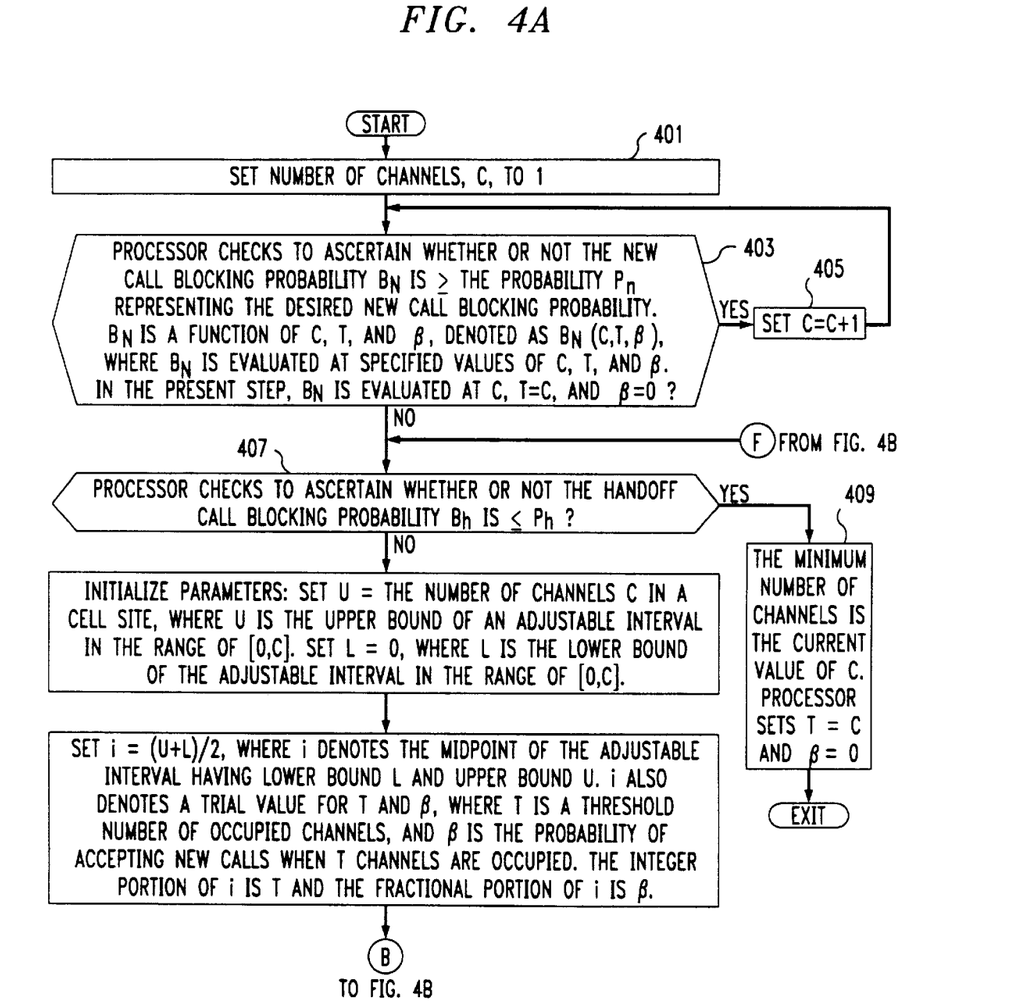
FIGS. 4A–4B together comprise a software flowchart setting forth a method of controlling call admission by computing optimized parameter settings for the fractional guard channel policy in the context of a second set of specified design objectives.
Figure 4B:
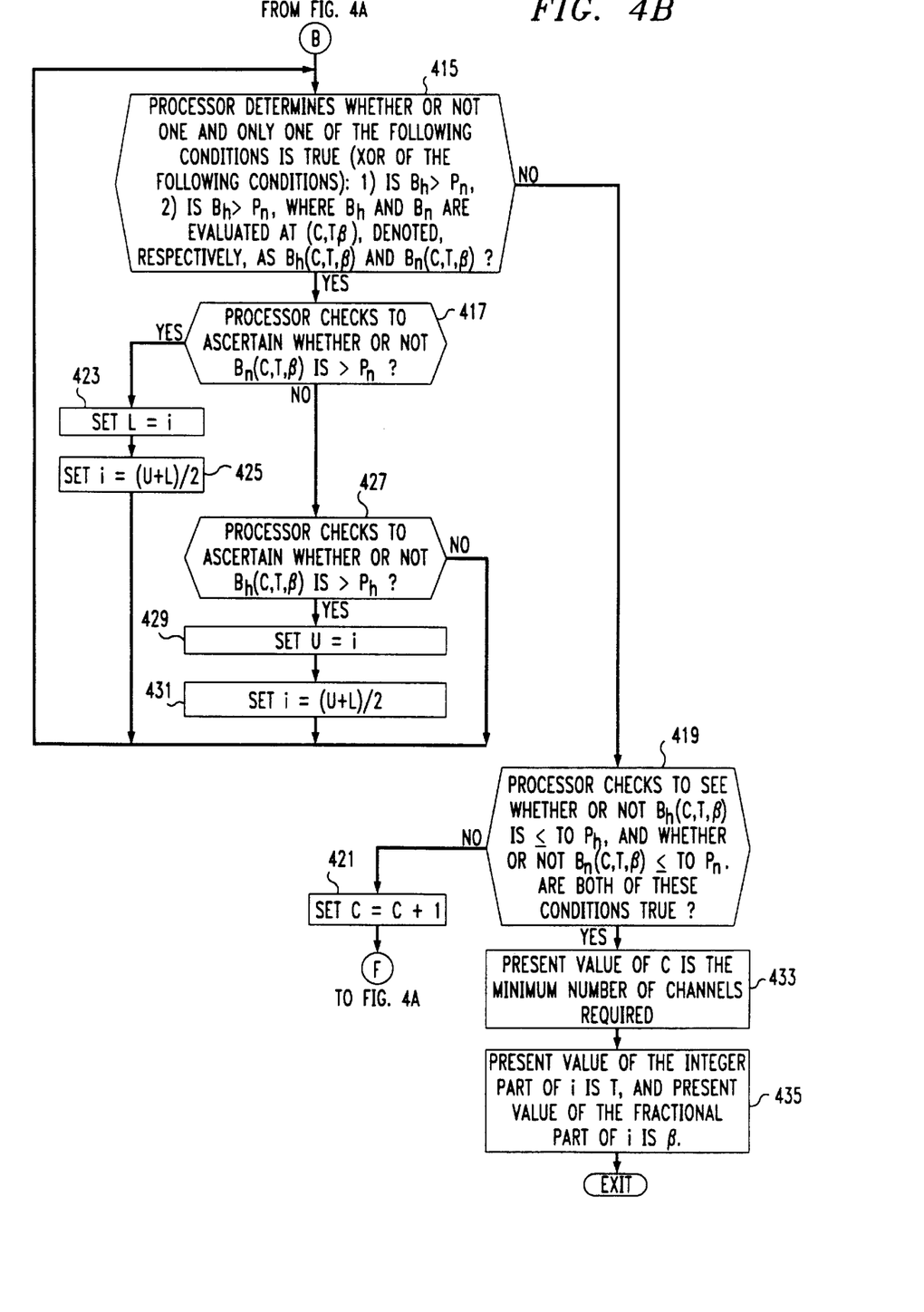

FIGS. 4A–4B together comprise a software flowchart setting forth a method of controlling call admission by computing optimized parameter settings for the fractional guard channel policy in the context of a second set of specified design objectives. More specifically, this method is advantageously employed where it is desired to minimize the number of required channels while, at the same time, placing fixed constraints on the blocking probabilities of new and handoff calls. The program commences at block 401 where the number of channels, denoted as C, is set to 1. Next (block 403), a processor checks to ascertain whether or not the new call blocking probability, $B_N$, is greater than or equal to the probability $P_n$ representing the desired new call blocking probability. This processor could be, for example, a base station processor conducting operations in real time, or, alternatively, an off-line processor conducting operations for purposes of system design and/or improvement. $B_N$ is a function of C, T, and β, denoted as $B_n$ (T, C, β), where T is a threshold number of occupied channels, and β, is the probability of accepting a new call when T channels are occupied. In this step, $B_N$ is evaluated at C,T=C, and β=0.

The affirmative branch from block 403 leads to block 405, where the processor sets C=(C+1), and the program loops back to block 403. The negative branch from block 403 leads to block 407, where the processor checks to ascertain whether or not the handoff call blocking probability, $B_h$, is less than or equal to $P_h$. If so, the program advances to block 409 where the minimum number of required channels is the current value of C. The processor sets T=C and β=0, and the program exits. The negative branch from block 407 leads to block 411 where various parameters are initialized. The upper bound, U, of an adjustable interval contained within the fixed interval [0,C] is set equal to the current value of the number of channels, C. The lower bound, L, of this adjustable interval is set equal to 0.

Program control progresses to block 413, where i, denoting the current midpoint of the adjustable interval having upper bound U and lower bound L, is set to (U+L)/2. Note that i also denotes a current trial value for T and β, where T is a threshold number of occupied channels, and β is the probability of accepting new calls when T channels are occupied. The integer portion of i is T, and the fractional portion of i is β. Next (block 415), the processor determines whether or not one and only one of the following conditions is true, effectively performing an exclusive-or (XOR) function on these conditions. The conditions are: (1) is $B_h$ greater than $P_h$, and (2) is $B_N$ greater than $P_n$, where $B_h$ and $B_n$, are evaluated at (C,T, β). If the exclusive-or of these conditions is true, program control progresses to block 417 and, if the exclusive-or of these conditions is false, program control progresses to block 419.

At block 419, the processor checks to see whether or not $B_h$ (C, T, β) is less than or equal to $P_h$, and whether or not $B_n$ (C,T, β) is less than or equal to $P_n$. If both of these conditions are true, the program advances to block 433, and if one or both of these conditions are false, the program advances to block 421. At block 433, the present value of C is determined to be the minimum number of channels required. At block 435, it is determined that the present value of the integer part of i is T, and the present value of the fractional part of i is β. The program then exits. However, if the negative branch from block 419 is followed, C is set to (C+1) at block 421, and the program loops back to block 407.

The affirmative branch from block 415 leads to block 417 where the processor checks to ascertain whether or not B(C,T, β) is greater than $P_n$. If so, L is set to i at block 423, i is set to (U+L)/2 at block 425, and the program loops back to block 415. The negative branch from block 417 leads to block 427 where the processor checks to ascertain whether or not $B_h$ (C, T, β) is greater than $P_h$. If not, the program loops back to block 415 and, if so, the program advances to block 429 where U is set to i. After block 429 is performed, i is set to (U+L)/2 at block 431, and the program loops back to block 415.

Figure 5:
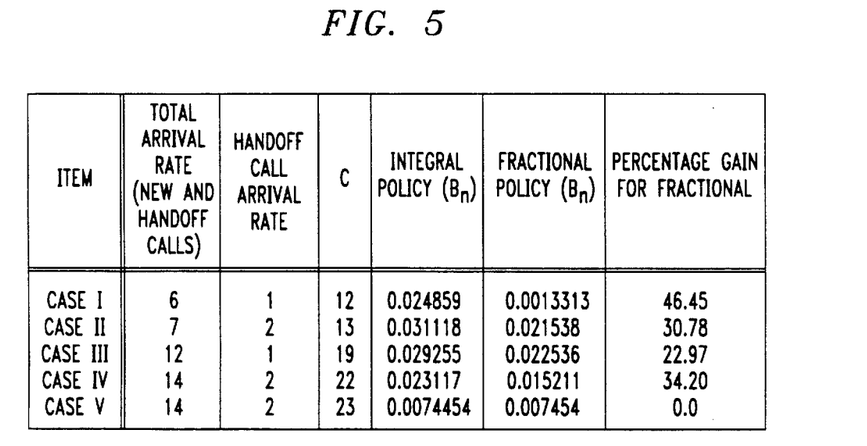
FIG. 5 is a table setting forth the performance of an illustrative wireless telephone network using the methods of FIGS. 2 and 3A–3C.

FIG. 5 illustrates wireless telephone network performance for the method of FIGS. 3A–3C where it is desired to minimize the new call blocking probability, $B_n$, while placing a fixed constraint on the handoff call blocking probability. Five examples were studied, Case I, Case II, Case III, Case IV, and Case V, wherein each example is based upon a specified arrival rate of new and handoff calls at the wireless telephone network, and also upon a specified number of channels. In Case I, an arrival rate of 6 calls per unit call holding time was studied, whereas, in Cases IV and V, arrival rates of 14 calls per unit call holding time were considered. In Case I, 12 channels were used, whereas Case V used a total of 23 channels. For each Case, the new call blocking probability values, $B_n$, are shown for the prior-art integral guard channel method, as well as for the fractional guard channel methods disclosed herein. Note that, within each Case, the methods disclosed herein provide an equal or a lower probability of rejecting a new call than the prior art method.

Figure 6:
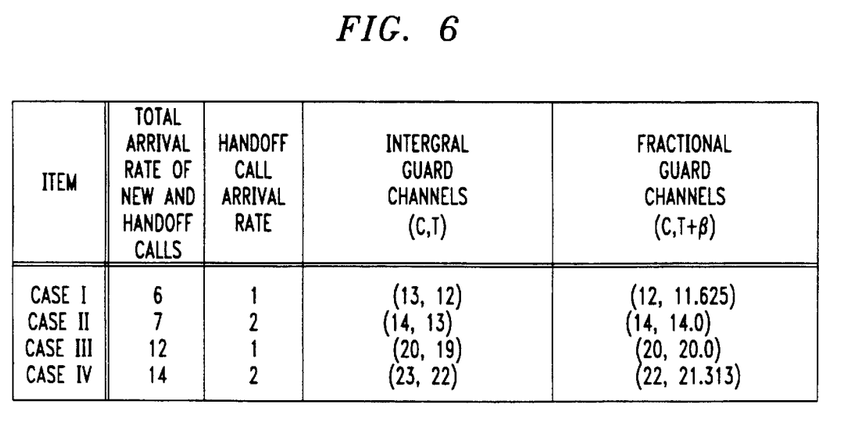
FIG. 6 is a table setting forth the performance of an illustrative wireless telephone network using the methods of FIGS. 2 and 4A–4C.

FIG. 6 illustrates wireless telephone network performance for the method of FIGS. 4A–4B where it is desired to minimize the number of required channels while placing fixed constraints on both the handoff call blocking probability and the new call blocking probability. Four examples were studied, Case I, Case II, Case III, and Case IV, wherein each example is based upon a specified arrival rate of new calls at the wireless telephone network. In Case I, an arrival rate of 6 calls per unit call holding time was studied, whereas, in Case IV, an arrival rate of 14 calls per unit call holding time was considered. For each Case, the number of required channels C is shown, along with the threshold number T of occupied channels, and the probability β for the fractional guard channel policy. Each of these parameters are shown for both the prior-art integral guard channel method, as well as for the fractional guard channel methods disclosed herein. Note that, within each Case, the prior-art method uses either the same number of channels, or more channels, than the methods disclosed herein.

We claim:

1. In a cell site equipped to provide communications over a plurality of channels, a method for admitting new or handoff calls into the cell site, the method comprising the steps of:

(a) the cell site reserving a number of channels as guard channels for hanoff calls;

(b) the cell site accepting new calls when the number of channels being used by the cell site to provide communications is below a specified threshold, rejecting new calls when the number of channels being used by the cell site to provide communications is above the specified threshold, and accepting new calls in accordance with a probability value when the number of channels being used by the cell site to provide communications is equal to the specified threshold;

(c) the cell site always accepting handoff calls unless all channels are occupied;

(d) the cell site checking to ascertain whether or not a specified constraint on the handoff call blocking probability can be met with C channels;

(e) the cell site initializing a first parameter, U, by setting U equal to the total number of channels C over which the cell site is equipped to provide communications, where U represents the upper bound of an adjustable interval contained entirely within the range of a fixed interval of [0, C];

(f) the cell site initializing a second parameter, L, by setting L equal to zero (0), where L represents the lower bound of the adjustable interval contained entirely within a fixed interval in the range of [0, C];

(g) the cell site initializing the maximum number of iterations to be performed, denoted as maxiter, to a desired value;

(h) the cell site setting the number of iterations actually performed to zero (0);

(i) the cell site setting a third parameter, i, equal to (U+L)/2, wherein i denotes the midpoint of the adjustable interval with lower bound L and upper bound U, wherein i also denotes a current estimate for T and β, wherein T is a threshold number of occupied channels, wherein β is the probability of accepting new calls when T channels are occupied, and wherein the integer portion of i is T, and the fractional portion of i is β;

(j) for a given current estimate of T and β, the cell site checking to ascertain whether or not the handoff call blocking probability, $B_h$, is less than or equal to the desired handoff call blocking probability value, $P_h$, wherein the handoff call blocking probability, $B_h$, is a function of C, T, and β, denoted as $B_h(C, T, β)$;

(k) if the handoff call blocking probability is less than or equal to the desired handoff call blocking probability, the cell site setting T=C and β=0, wherein T and β represent final estimates;

(l) if the handoff call blocking probability is not less than or equal to the desired handoff call blocking probability, the cell site determining whether or not the number of iterations actually performed is less than or equal to the maximum number of iterations to be performed, AND whether or not (U−L) is greater than the desired channel resolution;

(m) if any or both of the conditions of step (1) are not true, the cell site checking to ascertain whether or not $B_h$ is greater than $P_h$, where $B_h$ is evaluated at i, and where T is the integer part of i and β is the fractional part of I; and, if $B_h$ is greater than $P_h$, setting U equal to i, setting i equal to (U+L)/2, incrementing the number of iterations actually performed by 1, and going back to perform step (I); and if $B_h$ is not greater than $P_h$, setting L equal to i, setting i equal to (U+L)/2, incrementing the number of iterations actually performed by 1, and going back to perform step (1);

(n) if both of the conditions of step (1) are true, the cell site checking to ascertain whether or not $B_h$ is greater than $P_h$, where $B_h$ is evaluated at I, and if $B_h$ is greater than $P_h$, setting U equal to i, and setting i to (U+L)/2; and (o) the cell site taking the current estimate for i as the final estimate for i, where the integer part of i is T and the fractional part of i is β;

wherein the non-integral number of guard channels and the rejection probability value are each determined so as to minimize the probability of blocking new calls when a specified constraint is placed on the probability of blocking handoff calls.

2. In a wireless telephone network having a processor and a plurality of communications channels, the plurality of channels having a channel occupancy level specifying the number of occupied channels relative to the total number of channels, a wireless telephone network call admission method for admitting new and/or handoff calls into the wireless telephone network, the method comprising the steps of:

(a) the network reserving a non-integral number of guard channels for handoff calls;

(b) the network accepting new calls when the number of occupied channels is below a specified channel threshold, rejecting new calls when the number of occupied channels is above the specified channel threshold, and accepting new calls in accordance with a probability value when the number of occupied channels is equal to the specified channel threshold;

(c) the network always accepting handoff calls unless all channels are occupied;

(d) the processor setting the number of channels, denoted as C, to 1;

(e) the processor checking to ascertain whether or not the new call blocking probability, $B_N$, is greater than or equal to the probability $P_n$, representing the desired new call blocking probability; wherein $B_n$ is a function of C, T, and β, denoted as $B_N(T, C, β)$, where T is a threshold number of occupied channels, and β is the probability of accepting a new call when T channels are occupied, and such that $B_n$ is evaluated at C, T=C, and β=0;

(f) if the new call blocking probability is greater than or equal to the desired new call blocking probability, the processor setting C=(C+1), and going back to perform step (e);

(g) if the new call blocking probability is less than the desired new call blocking probability, the processor checking to ascertain whether or not the handoff call blocking probability, $B_h$, is less than or equal to $P_h$ and, if so, the processor setting the minimum number of required channels to the current value of C, by setting T=C and β=0;

(h) if the handoff call blocking probability is not less than or equal to $P_h$, the processor setting an upper bound, U, of an adjustable interval contained within the fixed interval [0, C], equal to the number of channels, C, in a cell site, and setting a lower bound, L, of the adjustable interval equal to 0; the processor setting i, denoting the current midpoint of the adjustable interval having upper bound U and lower bound L, equal to (U+L)/2, wherein i also denotes a current trial value for T and β, where T is a threshold number of occupied channels, and β is the probability of accepting new calls when T channels are occupied, and wherein the integer portion of i is T, and the fractional portion of i is β;

(i) if the handoff call blocking probability is not less than or equal to $P_h$, the processor determining whether or not one and only one of a first condition and a second conditions are true, thereby performing an exclusive-or (XOR) function on the first and second conditions, the first condition being whether or not $B_h$ is greater than $P_h$, and the second condition being whether or not $B_N$ is greater than $P_n$, where $B_h$ and $B_n$ are evaluated at (C, T, β);

(j) if the exclusive-or of the first and second conditions at step (i) is false, the processor checking to ascertain whether or not $B_h$ (C, T, β) is less than or equal to $P_h$, and whether or not $B_n$(C,T, β) is less than or equal to $P_n$, and, if both of these conditions are true, the processor determining that the present value of C is the minimum number of channels required, that the present value of the integer part of i is T, and that the present value of the fractional part of i is β and if one or both of these conditions are false, the processor setting C to (C+1), and the processor going back to perform step (g); and (k) if the exclusive-or of the first and second conditions at step (i) is true, the processor checking to ascertain whether or not $B_n$(C,T, β) is greater than $P_n$ and, if so, setting L equal to I, setting i equal to (U+L)/2, and going back to perform step (i) and, if $B_n$(C, T, β) is not greater than $P_n$, the processor checking to ascertain whether or not $B_h$ (C, T, β) is greater than $P_h$ and, if not, going back to perform step (i) and, if so, setting U equal to i, setting i equal to (U+L)/2, and going back to perform step (i);

wherein the non-integral number of guard channels and the rejection probability value are each determined so as to minimize the number of required channels when a specified constraint is placed on the blocking probabilities of new and handoff calls.

3. A method for use in a system in which telephone calls are communicated over wireless channels, the method comprising the steps of accepting new calls when the number of occupied channels is below a threshold, rejecting new calls when the number of occupied channels is above the threshold, and accepting new calls in accordance with a probability value when the number of occupied channels is substantially equal to the threshold.

4. A method for use in a system in which telephone calls are communicated over wireless channels, the method comprising the steps of accepting new calls when the number of occupied channels meets a first criterion, rejecting new calls when the number of occupied channels meets a second criterion, and accepting new calls in accordance with a probability value when the number of occupied channels does not meet either criteria.

5. The method of claim 3 further comprising the step of the system reserving a non-integral number of guard channels for handoff calls.

6. The method of claim 3 further comprising the step of the system always accepting handoff calls unless all channels are occupied.

7. In a cell site equipped to provide communications over a plurality of channels, a method for admitting new or handoff calls into the cell site, the method comprising the steps of:

(a) the cell site reserving a number of channels as guard channels for handoff calls;

(b) the cell site accepting new calls when the number of channels being used by the cell site to provide communications is below a specified channel threshold, rejecting new calls when the number of channels being used by the cell site to provide communications is above the specified channel threshold, and accepting new calls in accordance with a probability value when the number of channels being used by the cell site to provide communications is equal to the specified channel threshold; and (c) the cell site always accepting handoff calls unless all channels are occupied.

8. The method of claim 7 wherein said new calls are rejected with a specified rejection probability value, wherein the number of guard channels is a non-integral number, and wherein the non-integral number of guard channels and the rejection probability value are each determined so as to minimize the number of required channels.

9. The method of claim 8 wherein the number of required channels is minimized for a set of specified constraints on the blocking probabilities of new and handoff calls.

10. Apparatus comprising means for communicating telephone calls over a wireless channel, the apparatus including means for accepting new calls when the number of occupied channels is below a threshold, means for rejecting new calls when the number of occupied channels is above the threshold, and means for accepting new calls in accordance with a probability value when the number of occupied channels is substantially equal to the threshold.

11. Apparatus comprising means for communicating telephone calls over a wireless channel, the apparatus comprising means for accepting new calls when the number of occupied channels meets a first criterion, means for rejecting new calls when the number of occupied channels meets a second criterion, and means for accepting new calls in accordance with a probability value when the number of occupied channels does not meet either criteria.

12. The apparatus of claim 11 further comprising means for reserving a non-integral number of guard channels for handoff calls.

13. The apparatus of claim 11 further comprising means for always accepting handoff calls unless all channels are occupied.

14. In a cell site equipped to provide communications over a plurality of channels, means for admitting new or handoff calls into the cell site, the means comprising:

(a) reservation means for reserving a number of channels as guard channels for handoff calls, (b) new call acceptance means for accepting new calls when the number of channels being used by the cell site to provide communications is below a specified channel threshold, the new call acceptance means rejecting new calls when the number of channels being used by the cell site to provide communications is above the specified channel threshold, and the new call acceptance means accepting new calls in accordance with a probability value when the number of channels being used by the cell site to provide communications is equal to the specified channel threshold; and (c) handoff call acceptance means for always accepting handoff calls unless all channels are occupied.

15. The apparatus of claim 14 wherein the number of guard channels is a non-integral number, the apparatus further comprising means for rejecting new calls with a specified rejection probability value, wherein the non-integral number of guard channels and the rejection probability value are each determined so as to minimize the number of required channels.

16. The apparatus of claim 15 wherein the number of required channels is minimized for a set of specified constraints on the blocking probabilities of new and handoff calls.

* * * * *